US012385761B2

(12) United States Patent
Luan et al.

(10) Patent No.: US 12,385,761 B2
(45) Date of Patent: Aug. 12, 2025

(54) MULTI-DIMENSIONAL PRECISION SPOT INSPECTION METHOD AND SYSTEM FOR THERMAL POWER EQUIPMENT

(71) Applicants: Huaneng Jinan Huangtai Power Generation Co., Ltd., Shandong (CN); Shandong Huaneng Power Generation Co.,Ltd., Shandong (CN)

(72) Inventors: Jun Luan, Shandong (CN); Xianchao Lu, Shandong (CN); Jie Li, Shandong (CN); Yuling Wang, Shandong (CN); Zhongyu Tian, Shandong (CN); Rui Wan, Shandong (CN); Kebing Wang, Shandong (CN); Jianyong Ren, Shandong (CN); Peng Sun, Shandong (CN); Shuwen Leng, Shandong (CN); Xueli Li, Shandong (CN)

(73) Assignees: Huaneng Jinan Huangtai Power Generation Co., Ltd., Jinan (CN); Shandong Huaneng Power Generation Co. Ltd., Jinan (CN)

( * ) Notice: Subject to any disclaimer, the term of this patent is extended or adjusted under 35 U.S.C. 154(b) by 200 days.

(21) Appl. No.: 18/348,350

(22) Filed: Jul. 7, 2023

(65) Prior Publication Data
US 2024/0280378 A1    Aug. 22, 2024

Related U.S. Application Data

(63) Continuation of application No. PCT/CN2023/096717, filed on May 29, 2023.

(30) Foreign Application Priority Data

Feb. 20, 2023    (CN) .......................... 202310135549.0

(51) Int. Cl.
    *G01D 3/06*     (2006.01)
    *G01D 21/02*    (2006.01)

(52) U.S. Cl.
    CPC ............. *G01D 3/063* (2013.01); *G01D 21/02* (2013.01)

(58) Field of Classification Search
    CPC ......... G01D 3/063; G01D 21/02; G05B 23/02
    See application file for complete search history.

(56) References Cited

U.S. PATENT DOCUMENTS

| 5,844,410 A     * | 12/1998 | Ikuta ..................... G01R 15/247 324/96 |
| 2015/0355274 A1 * | 12/2015 | Ross ...................... G01R 31/311 324/754.23 |

(Continued)

*Primary Examiner* — Lee E Rodak
*Assistant Examiner* — Zannatul Ferdous (57) ABSTRACT

A multi-dimensional precision spot inspection method and system for thermal power equipment, and the method includes: determine the equipment requiring precision spot inspection and the initial test period of the equipment to be inspected; acquire the historical precision spot inspection information of the equipment to be inspected, adjust the initial test period of the equipment to be inspected according to the historical precision spot inspection information, and obtain the first test period; perform the precise spot inspection on the equipment to be inspected according to the first test period, obtain the precision spot inspection result within the first test period, and adjust the first test period to obtain the second test period when the precision spot inspection result is more than or equal to the standard value. In the invention, the test period of the thermal power equipment is adjusted, effectively improving the effectiveness and accuracy of the test period.

5 Claims, 2 Drawing Sheets

(56) References Cited

U.S. PATENT DOCUMENTS

2021/0148879 A1* 5/2021 Liu .................... G01N 33/007
2024/0280378 A1* 8/2024 Luan .................... G05B 23/02

* cited by examiner

MULTI-DIMENSIONAL PRECISION SPOT INSPECTION METHOD AND SYSTEM FOR THERMAL POWER EQUIPMENT

CROSS-REFERENCE TO RELATED APPLICATIONS

This application is a continuation of PCT/CN2023/096717, filed May 29, 2023 and claims priority of Chinese Patent Application No. 202310135549.0, filed on Feb. 20, 2023, the entire contents of which are incorporated herein by reference.

TECHNICAL FIELD

The invention relates to the technical field of thermal power equipment, in particular to a multi-dimensional precision spot inspection method and system for thermal power equipment.

BACKGROUND ART

Precision spot inspection refers to comprehensive equipment testing and investigation by use of precision testing instruments, or determination of vibration, temperature, crack, insulation, temperature rise, deformation and other physical quantities of equipment by use of diagnostic technology, special instruments, tools or special methods without equipment disassembly, and quantitative determination of technical conditions and deterioration degree of equipment by analysis, comparison, determination according to the standards.

As there are numerous thermal power equipment, the thermal power equipment is tested offline by use of precision testing instruments and meters during precision spot inspection. In the normal operation, the physical quantities that characterize the operating state of the equipment are determined by using the vibration, infrared, ultrasonic, current spectrum, oil and other testing instruments, and the technical conditions and deterioration degree of the equipment are determined according to the standards.

The Chinese patent application CN113405822A relates to a precision spot inspection method for thermal power equipment, which includes the following steps: S1, determine the equipment incorporated in the precision spot inspection; S2, determine the location and number of measuring points of the equipment; S3, determine the test period; S4, create a matched technical means according to the working principle and physical and chemical characteristics of each equipment; S5, test by the corresponding technical means according to the test period; S6, evaluate the test results. The test period of the equipment is determined according to the importance of the equipment and dynamically adjusted according to the operating state of the equipment. When the operating state of the equipment deteriorates, the test frequency is increased. The invention has the advantage of dynamically adjusting the test period according to the importance of the equipment and the operating state.

However, how to acquire multi-dimensional information of thermal power equipment for precise spot inspection to timely adjust the test period of thermal power equipment for precision spot inspection has become an urgent problem to be solved.

Content of Invention

In view of this, the invention provides a multi-dimensional precision spot inspection method and system for thermal power equipment, aiming at solving the problem of how to perform the precision spot inspection for the thermal power equipment according to the multi-dimensional information of the thermal power equipment to timely adjust the test period of the thermal power equipment for precision spot inspection.

On the one hand, the invention provides a multi-dimensional precision point inspection method for thermal power equipment, including:

Determine the equipment requiring precision spot inspection, mark the equipment as the equipment to be inspected, determine the importance index of the equipment to be inspected, and determine the initial test period of the equipment to be inspected according to the importance index;

Acquire the historical precision spot inspection information of the equipment to be inspected, adjust the initial test period of the equipment to be inspected according to the historical precision spot inspection information, and obtain the first test period;

Perform the precision spot inspection on the equipment to be inspected according to the first test period, obtain the precision spot inspection results within the first test period, continue performing the precision spot inspection on the equipment to be inspected according to the first test period when the precision spot inspection result is less than the standard value, adjust the first test period to obtain the second test period when the precision spot inspection result is more than or equal to the standard value, and perform the precision spot inspection on the equipment to be inspected according to the second test period.

Further, determining the initial test period of the equipment to be inspected according to the importance index includes:

Determine the importance index A0 of the equipment to be inspected, preset the first preset importance index A1, the second preset importance index A2, the third preset importance index A3 and the fourth preset importance index A4, and A1>A2>A3>A4;

Preset the first preset test period T1, the second preset test period T2, the third preset test period T3 and the fourth preset test period T4, and 0<T1<T2<T3<T4;

Determine the initial test period of the equipment to be inspected according to the relationship between the importance index A0 and each preset importance index:

When A0≥A1, select the first preset test period T1 as the initial test period of the equipment to be inspected;

When A1>A0≥A22, select the second preset test period T2 as the initial test period of the equipment to be inspected;

When A2>A0≥A3, select the third preset test period T3 as the initial test period of the equipment to be inspected;

When A3>A0≥A4, select the fourth preset test period T4 as the initial test period of the equipment to be inspected;

After the ith preset test period Ti is selected as the initial test period of the equipment to be inspected, i=1,2,3,4, and then the initial test period of the equipment to be inspected is Ti at this time, which is denoted as the initial test period Ti;

Further, obtaining the historical precision spot inspection information of the equipment to be inspected, adjusting the initial test period of the equipment to be inspected according to the historical precision spot inspection information and obtaining the first test period include:

After determining the initial test period Ti, acquire the historical precision spot inspection information of the equipment to be inspected, which includes the historical precision spot inspection result data and the historical maintenance data of the equipment to be inspected, and adjust the initial test test period Ti according to the historical precision spot inspection result data and the historical maintenance data; wherein, After obtaining the historical precision inspection check information, determine whether the historical precision spot inspection result data and the historical maintenance data are obtained:

If only the historical precision spot inspection result data is obtained, determine the difference between two adjacent historical precision spot inspection result data, adjust the initial test period Ti according to the difference between two adjacent historical precision spot inspection result data to obtain the first test period;

If both the historical precision spot inspection result data and the historical maintenance data are obtained, determine the difference between two adjacent historical precision spot inspection result data, obtain the historical maintenance frequency of the equipment to be inspected, adjust the initial test period Ti according to the difference between two adjacent historical precision spot inspection result data, and then correct the adjusted initial test period Ti according to the historical maintenance frequency to obtain the first test period.

Further, adjusting the initial test period Ti based on the difference between two adjacent historical precision spot inspection result data includes:

After obtaining the historical precision spot inspection result data, establish the historical result matrix B according to the historical precision spot inspection result data, set B (C1, D1, E1, C2, D2, E2, C3, D3, E3, . . . , Cn, Dn, En), where C1 to Cn are overall vibration values of the equipment to be inspected which are respectively obtained from the 1st precision spot inspection to the nth precision spot inspection, D1 to Dn are infrared temperature values of the equipment to be inspected which are respectively obtained from the 1st precision spot inspection to the nth precision spot inspection, E1 to En are ultrasonic values of the equipment to be inspected which are respectively obtained from the 1st precision spot inspection to the nth precision spot inspection;

Preset the preset overall vibration difference c0, the preset standard infrared temperature difference d0 and the preset standard ultrasonic difference e0; preset the first preset adjustment coefficient z1, the second preset adjustment coefficient z2 and the third preset adjustment coefficient z3, and $1 > z1 > z2 > z3 > 0.8$;

Obtain the overall vibration values, the infrared temperature values and the ultrasonic values within the last two periods in the historical result matrix B, obtain two adjacent overall vibration differences, denoted as Cn−1−Cn, obtain two adjacent infrared temperature differences, denoted as Dn−1-Dn, and obtain two adjacent ultrasonic differences, denoted as En-1-En;

Compare Cn−1−Cn, Dn−1−Dn and En-1-En with c0, d0 and e0 respectively, and select the adjustment coefficient according to the comparison results to adjust the initial test period Ti:

When Cn−1−Cn≤c0, Dn−1−Dn≤d0 and En−1−En≤e0, the initial test period Ti is not adjusted;

When Cn−1−Cn>c0, Dn−1−Dn≤d0 and En−1−En≤e0, or Cn−1−Cn≤c0, Dn−1−Dn>d0 and En−1−En≤e0, or Cn−1−Cn≤c0, Dn−1−Dn≤d0 and En−1−En>e0, select the first preset adjustment coefficient z1 to adjust the initial test period Ti, the adjusted initial test period is Ti*z1, and Ti*z1 is an integer;

When Cn−1−Cn>c0, Dn−1−Dn>d0 and En−1−En≤e0, or Cn−1−Cn≤c0, Dn−1−Dn>d0 and En−1−En>e0, or Cn−1−Cn>c0, Dn−1−Dn≤d0 and En−1−En>e0, select the second preset adjustment coefficient z2 to adjust the initial test period Ti, the adjusted initial test period is Ti*z2, and Ti*z2 is an integer;

When Cn−1−Cn>c0, Dn−1−Dn>d0 and En−1−En>e0, select the third preset adjustment coefficient z3 to adjust the initial test period Ti, the adjusted initial test period is Ti*z3, and Ti*z3 is an integer;

After the mth preset adjustment coefficient zm is selected to adjust the initial test period Ti, m=1,2,3, and then the adjusted initial test period Ti*zm is taken as the first test period.

Further, taking the adjusted initial test period Ti*zm as the first test period includes:

After establishing the historical result matrix B based on the historical precision spot inspection result data, determine the overall vibration average c01, the infrared temperature average d01 and the ultrasonic average e01 according to the historical result matrix B, where $$c01 = (C_1 + C_2 + C_3 + \ldots + C_n)/n, d01 =$$
$$(D_1 + D_2 + D_3 + \ldots + D_n)/n, \text{ and } e01 = (D_1 + D_2 + D_3 + \ldots + D_n)/n;$$

Preset the preset standard overall vibration average ca, the preset standard infrared temperature average da and the preset standard ultrasonic average ea, and adjust the adjusted initial test period Ti*zm again according to the relationship between the overall vibration average c01, the infrared temperature average d01 and the ultrasonic average e01, and the preset standard overall vibration average ca, the preset standard infrared temperature average da and the preset standard ultrasonic average ea respectively:

When c01≤ca, d01≤da and e01≤ea, the adjusted initial test period Ti*zm is not adjusted again.

When c01>ca, d01≤da and e01≤ea, or c01≤ca, d01>da and e01≤ea, or c01≤ca, d01≤da and e01>ea, select the first preset adjustment coefficient z1 to adjust the adjusted initial test period Ti*zm again, the readjusted test period is Ti*zm*z1, and Ti*zm*z1 is an integer;

When c01>ca, d01>da and e01≤ea, or c01≤ca, d01>da and e01≤ea, or c01>ca, d01≤da and e01>ea, select the second preset adjustment coefficient z2 to adjust the adjusted initial test period Ti*zm again, the readjusted test period is Ti*zm*z2, and Ti*zm*z2 is an integer;

When c01>ca, d01>da and e01>ea, select the third preset adjustment coefficient z3 to adjust the adjusted initial test period Ti*zm again, the readjusted test period is Ti*zm*z3, and Ti*zm*z3 is an integer.

After the mth preset adjustment coefficient zm is selected to adjust the adjusted initial test period Ti*zm again, m=1, 2,3, and then the adjusted initial test period Ti*zm*zm is taken as the first test period.

Further, adjusting the initial test period Ti according to the difference between two adjacent historical precision spot inspection result data and then correcting the adjusted initial test period Ti according to the historical maintenance frequency to obtain the first test period include:

After obtaining the historical maintenance data, determine the historical maintenance frequency Q0 of the equipment to be inspected according to the historical maintenance data;

Preset the first preset maintenance frequency Q1, the second preset maintenance frequency Q2, the third preset maintenance frequency Q3 and the fourth preset maintenance frequency Q4, and Q1<Q2<Q3<Q4; preset the first preset correction coefficient y1, the second preset correction coefficient y2, the third preset correction coefficient y3 and the fourth preset correction coefficient y4, and $1<y1<y2<y3<y4<1.5$;

After obtaining the adjusted initial test period $T_i*zm$ or $T_i*zm*zm$, select the correction coefficient according to the relationship between the historical maintenance frequency Q0 and each preset maintenance frequency, and correct the adjusted initial test period $T_i*zm$ or $T_i*zm*zm$:

When $Q1 \leq Q0 < Q2$, select the first preset correction coefficient y1 to correct the adjusted initial test period $T_i*zm$ or $T_i*zm*zm$, and the corrected test period is $T_i*zm*y1$ or $T_i*zm*zm*y1$;

When $Q2 \leq Q0 < Q3$, select the second preset correction coefficient y2 to correct the adjusted initial test period $T_i*zm$ or $T_i*zm*zm$, and the corrected test period is $T_i*zm*y2$ or $T_i*zm*zm*y2$;

When $Q3 \leq Q0 < Q4$, select the third preset correction coefficient y3 to correct the adjusted initial test period $T_i*zm$ or $T_i*zm*zm$, and the corrected test period is $T_i*zm*y3$ or $T_i*zm*zm*y3$;

When $Q4 \leq Q0$, select the fourth preset correction coefficient y4 to correct the adjusted initial test period $T_i*zm$ or $T_i*zm*zm$, and the corrected test period is $T_i*zm*y4$ or $T_i*zm*zm*y4$;

After selecting the ith preset correction coefficient yi to correct the adjusted initial test period $T_i*zm$ or $T_i*zm*zm$, $i=1,2,3,4$, and the corrected test period $T_i*zm*yi$ or $T_i*zm*zm*yi$ is taken as the first test period.

Further, taking the corrected test period $T_i*zm*yi$ or $T_i*zm*zm*yi$ as the first test period includes:

Perform the precision spot inspection on the equipment to be inspected according to the first test period, and obtain the precision spot inspection results within the first test period, which includes the overall vibration value $\Delta C1$, the infrared temperature value $\Delta D1$ and the ultrasonic value $\Delta E1$ within the first test period; wherein, When the overall vibration value $\Delta C1$, the infrared temperature value $\Delta D1$ and the ultrasonic value $\Delta E1$ within the first test period are less than the standard values, do not adjust the first test period $T_i*zm*yi$ or $T_i*zm*zm*yi$, and continue to perform the precision spot inspection on the equipment to be inspected according to the first test period;

When at least one of the overall vibration value $\Delta C1$, the infrared temperature value $\Delta D1$ and the ultrasonic value $\Delta E1$ within the first test period is more than or equal to the standard value, adjust the first test period $T_i*zm*yi$ or $T_i*zm*zm*yi$ to obtain the second test period, and perform the precision spot inspection on the equipment to be inspected according to the second test period.

Further, presetting the standard values which include the preset standard overall vibration value C10, the preset standard infrared temperature value D10 and the preset standard ultrasonic value E10 and obtaining the overall vibration value $\Delta C1$, the infrared temperature value $\Delta D1$ and the ultrasonic value $\Delta E1$ within the first test period include:

Preset the first compensation coefficient r1, the second compensation coefficient r2, the third compensation coefficient r3 and the fourth compensation coefficient r4, and $0.8 < r1 < r2 < r3 < r4 < 1$;

When $\Delta C1 < C10$, A $D1 < D10$ and $\Delta E1 < E10$, the first test period $T_i*zm*yi$ or $T_i*zm*zm*yi$ is not adjusted;

When at least one of the overall vibration value $\Delta C1$, the infrared temperature value $\Delta$ D1 and the ultrasonic value $\Delta E1$ within the first test period is more than or equal to the standard value, adjust the first test period $T_i*zm*yi$ or $T_i*zm*zm*yi$, specifically:

When $\Delta C1 \geq C10$, $\Delta D1 < D10$ and $\Delta E1 < E10$, or $\Delta C1 < C10$, $\Delta D1 \geq D10$ and A $E1 < E10$, or $\Delta C1 < C10$, $\Delta D1 < D10$ and $\Delta E1 \geq E10$, select the first compensation coefficient r1 to compensate the first test period $T_i*zm*yi$ or $T_i*zm*zm*yi$, and the compensated test period is $T_i*zm*yi*r1$ or $T_i*zm*zm*yi*r1$, which is taken as the second test period;

When $\Delta C1 \geq C10$, $\Delta D1 \geq D10$ and $\Delta E1 < E10$, or $\Delta C1 \geq C10$, A $D1 < D10$ and A $E1 \geq E10$, or $\Delta C1 < C10$, $\Delta D12 \geq D10$ and $\Delta E1 \geq E10$, select the second compensation coefficient r2 to compensate the first test period $T_i*zm*yi$ or $T_i*zm*zm*yi$, and the compensated test period is $T_i*zm*yi*r2$ or $T_i*zm*zm*yi*r2$, which is taken as the second test period;

When $\Delta C1 \geq C10$, $\Delta D1 \geq D10$ and $\Delta E1 \geq E10$, select the third compensation coefficient r3 to compensate the first test period $T_i*zm*yi$ or $T_i*zm*zm*yi$, and the compensated test period is $T_i*zm*yi*r3$ or $T_i*zm*zm*yi*r3$, which is taken as the second test period.

Compared with the prior art, the invention has the beneficial effects of determining the equipment requiring precision spot inspection, determining the importance index of the equipment to be inspected, determining the initial test period of the equipment to be inspected according to the importance index, acquiring the historical precision spot inspection of the equipment to be inspected, adjusting the initial test period of the equipment to be inspected according to the historical precision spot inspection information, obtaining the first test period, performing the precision spot inspection on the equipment to be inspected according to the first test period, obtaining the precision spot inspection results within the first test period, continuing performing the precision spot inspection on the equipment to be inspected according to the first test period when the precision spot inspection result is less than the standard value, adjusting the first test period to obtain the second test period when the precision spot inspection result is more than or equal to the standard value, and performing the precision spot inspection on the equipment to be inspected according to the second test period. In the invention, the test period of the thermal power equipment is adjusted by acquiring the multi-dimensional data information of the thermal power equipment, effectively improving the effectiveness and accuracy of the test period.

On the other hand, the invention also provides a multi-dimensional precision point inspection system for thermal power equipment, comprising:

A determining module, which is used to determine the equipment requiring precision spot inspection, mark the equipment as the equipment to be inspected, determine the importance index of the equipment to be inspected, and determine the initial test period of the equipment to be inspected according to the importance index;

An acquisition module, which is used to acquire the historical precision spot inspection information of the equipment to be inspected, adjust the initial test period of the equipment to be inspected according to the historical precision spot inspection information, and obtain the first test period;

An processing module, which is used to perform the precision spot inspection on the equipment to be inspected according to the first test period, obtain the precision spot inspection results within the first test period, continue performing the precision spot inspection on the equipment to be inspected according to the first test period when the precision spot inspection result is less than the standard value, adjust the first test period to obtain the second test period when the precision spot inspection result is more than or equal to the standard value, and perform the precision spot inspection on the equipment to be inspected according to the second test period.

Further, the determining module is also used to determine the initial test period of the equipment to be inspected according to the importance index, including:

Determine the importance index A0 of the equipment to be inspected, preset the first preset importance index A1, the second preset importance index A2, the third preset importance index A3 and the fourth preset importance index A4, and A1>A2>A3>A4;

Preset the first preset test period T1, the second preset test period T2, the third preset test period T3 and the fourth preset test period T4, and 0≤T1<T2<T3<T4;

Determine the initial test period of the equipment to be inspected according to the relationship between the importance index A0 and each preset importance index:

When A0≥A1, select the first preset test period T1 as the initial test period of the equipment to be inspected;

When A1>A0≥A22, select the second preset test period T2 as the initial test period of the equipment to be inspected;

When A2>A0≥A3, select the third preset test period T3 as the initial test period of the equipment to be inspected;

When A3>A0≥A4, select the fourth preset test period T4 as the initial test period of the equipment to be inspected;

After the ith preset test period Ti is selected as the initial test period of the equipment to be inspected, i=1,2,3,4, and then the initial test period of the equipment to be inspected is Ti at this time, which is denoted as the initial test period Ti.

It is understandable that the multi-dimensional precision spot inspection method and system for the thermal power equipment have the same beneficial effects and will not be repeated here.

DESCRIPTION OF DRAWINGS

By reading the detailed description of the preferred embodiments below, various other advantages and benefits will become clear to the ordinary technicians in the field. The drawings are intended only for the purpose of showing a preferred embodiment and are not considered to be a limitation to the invention. Moreover, the same parts are represented by the same reference marks throughout the drawings. In the drawings.

EMBODIMENTS

The exemplary embodiments of the invention are described in more detail below with reference to the drawings. Although the exemplary embodiments of the invention are shown in the drawings, it should be understood that the invention may be implemented in various forms and should not be limited by the embodiments set forth herein. On the contrary, these embodiments are provided to enable a more thorough understanding of the invention and a complete communication of the scope of the invention to the technicians in the field. It should be noted that the embodiments and features in the embodiments of the invention can be combined with each other without conflict. The invention is described in detail below with reference to the drawings and in conjunction with the embodiments.

Figure 1:
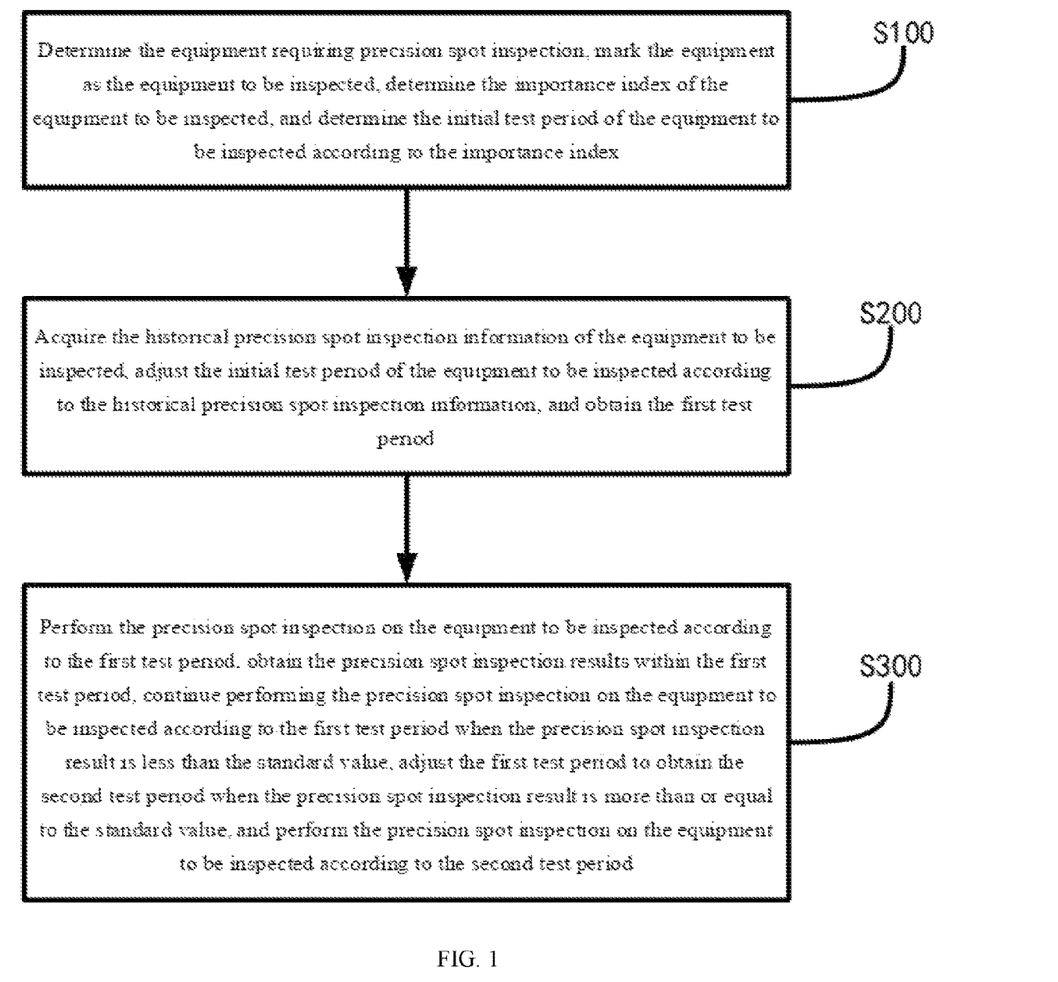
FIG. 1 is the flowchart of a multi-dimensional precision spot inspection method for thermal power equipment provided by the embodiment of the invention.

As shown in FIG. 1, the embodiment discloses a multi-dimensional precision spot inspection method for thermal power equipment, including the following steps:

Step S100: Determine the equipment requiring precision spot inspection, mark the equipment as the equipment to be inspected, determine the importance index of the equipment to be inspected, and determine the initial test period of the equipment to be inspected according to the importance index.

Specifically, determining the initial test period of the equipment to be inspected according to the importance index includes:

Determine the importance index A0 of the equipment to be inspected, preset the first preset importance index A1, the second preset importance index A2, the third preset importance index A3 and the fourth preset importance index A4, and A1>A2>A3>A4;

Preset the first preset test period T1, the second preset test period T2, the third preset test period T3 and the fourth preset test period T4, and 0≤T1<T2<T3<T4;

Determine the initial test period of the equipment to be inspected according to the relationship between the importance index A0 and each preset importance index:

When A0≥A1, select the first preset test period T1 as the initial test period of the equipment to be inspected;

When A1>A0≥A22, select the second preset test period T2 as the initial test period of the equipment to be inspected;

When A2>A0≥A3, select the third preset test period T3 as the initial test period of the equipment to be inspected;

When A3>A0≥A4, select the fourth preset test period T4 as the initial test period of the equipment to be inspected;

After the ith preset test period Ti is selected as the initial test period of the equipment to be inspected, i=1,2,3,4, and then the initial test period of the equipment to be inspected is Ti at this time, which is denoted as the initial test period Ti.

Step S200: Acquire the historical precision spot inspection information of the equipment to be inspected, adjust the initial test period of the equipment to be inspected according to the historical precision spot inspection information, and obtain the first test period;

Specifically, obtaining the historical precision spot inspection information of the equipment to be inspected, adjusting the initial test period of the equipment to be inspected according to the historical precision spot inspection information and obtaining the first test period include:

After determining the initial test period Ti, acquire the historical precision spot inspection information of the equipment to be inspected, which includes the historical precision spot inspection result data and the historical maintenance data of the equipment to be inspected, and adjust the initial test test period Ti according to the historical precision spot inspection result data and the historical maintenance data; wherein, After obtaining the historical precision inspection check information, determine whether the historical precision spot inspection result data and the historical maintenance data are obtained:

If only the historical precision spot inspection result data is obtained, determine the difference between two adjacent historical precision spot inspection result data, adjust the initial test period Ti according to the difference between two adjacent historical precision spot inspection result data to obtain the first test period;

If both the historical precision spot inspection result data and the historical maintenance data are obtained, determine the difference between two adjacent historical precision spot inspection result data, obtain the historical maintenance frequency of the equipment to be inspected, adjust the initial test period Ti according to the difference between two adjacent historical precision spot inspection result data, and then correct the adjusted initial test period Ti according to the historical maintenance frequency to obtain the first test period.

Specifically, adjusting the initial test period Ti based on the difference between two adjacent historical precision spot inspection result data includes:

After obtaining the historical precision spot inspection result data, establish the historical result matrix B according to the historical precision spot inspection result data, set B (C1, D1, E1, C2, D2, E2, C3, D3, E3, . . . , Cn, Dn, En), where C1 to Cn are overall vibration values of the equipment to be inspected which are respectively obtained from the 1st precision spot inspection to the nth precision spot inspection, D1 to Dn are infrared temperature values of the equipment to be inspected which are respectively obtained from the 1st precision spot inspection to the nth precision spot inspection, E1 to En are ultrasonic values of the equipment to be inspected which are respectively obtained from the 1st precision spot inspection to the nth precision spot inspection;

Preset the preset overall vibration difference c0, the preset standard infrared temperature difference d0 and the preset standard ultrasonic difference e0; preset the first preset adjustment coefficient z1, the second preset adjustment coefficient z2 and the third preset adjustment coefficient z3, and 1>z1>z2>z3>0.8;

Obtain the overall vibration values, the infrared temperature values and the ultrasonic values within the last two periods in the historical result matrix B, obtain two adjacent overall vibration differences, denoted as Cn−1−Cn, obtain two adjacent infrared temperature differences, denoted as Dn−1−Dn, and obtain two adjacent ultrasonic differences, denoted as En−1−En;

Compare Cn−1−Cn, Dn−1−Dn and En−1−En with c0, d0 and e0 respectively, and select the adjustment coefficient according to the comparison results to adjust the initial test period Ti:

When Cn−1−Cn<c0, Dn−1−Dn<d0 and En−1−En<e0, the initial test period Ti is not adjusted;

When Cn−1−Cn>c0, Dn−1−Dn≤d0 and En−1−En≤e0, or Cn−1−Cn≤c0, Dn−1−Dn>d0 and En−1−En≤e0, or Cn−1−Cn≤c0, Dn−1−Dn≤d0 and En−1−En>e0, select the first preset adjustment coefficient z1 to adjust the initial test period Ti, the adjusted initial test period is Ti*z1, and Ti*z1 is an integer;

When Cn−1−Cn>c0, Dn−1−Dn>d0 and En−1−En≤e0, or Cn−1−Cn≤c0, Dn−1−Dn>d0 and En−1−En>e0, or Cn−1−Cn>c0, Dn−1−Dn≤d0 and En−1−En>e0, select the second preset adjustment coefficient z2 to adjust the initial test period Ti, the adjusted initial test period is Ti*z2, and Ti*z2 is an integer;

When Cn−1−Cn>c0, Dn−1−Dn>d0 and En−1−En>e0, select the third preset adjustment coefficient z3 to adjust the initial test period Ti, the adjusted initial test period is Ti*z3, and Ti*z3 is an integer;

After the mth preset adjustment coefficient zm is selected to adjust the initial test period Ti, m=1,2,3, and then the adjusted initial test period Ti*zm is taken as the first test period.

Specifically, taking the adjusted initial test period Ti*zm as the first test period includes:

After establishing the historical result matrix B based on the historical precision spot inspection result data, determine the overall vibration average c01, the infrared temperature average d01 and the ultrasonic average e01 according to the historical result matrix B, where c01=(C1+C2+C3+ . . . +Cn)/n, d01=(D1+D2+D3+ . . . +Dn)/n, and e01=(D1+D2+D3+ . . . +Dn)/n;

Preset the preset standard overall vibration average ca, the preset standard infrared temperature average da and the preset standard ultrasonic average ea, and adjust the adjusted initial test period Ti*zm again according to the relationship between the overall vibration average c01, the infrared temperature average d01 and the ultrasonic average e01, and the preset standard overall vibration average ca, the preset standard infrared temperature average da and the preset standard ultrasonic average ea respectively:

When c01≤ca, d01≤da and e01≤ea, the adjusted initial test period Ti*zm is not adjusted again.

When c01>ca, d01≤da and e01≤ea, or c01≤ca, d01>da and e01≤ea, or c01≤ca, d01≤da and e01>ea, select the first preset adjustment coefficient z1 to adjust the adjusted initial test period Ti*zm again, the readjusted test period is Ti*zm*z1, and Ti*zm*z1 is an integer;

When c01>ca, d01>da and e01≤ea, or c01≤ca, d01>da and e01≤ea, or c01>ca, d01≤da and e01>ea, select the second preset adjustment coefficient z2 to adjust the adjusted initial test period Ti*zm again, the readjusted test period is Ti*zm*z2, and Ti*zm*z2 is an integer;

When c01>ca, d01>da and e01>ea, select the third preset adjustment coefficient z3 to adjust the adjusted initial test period Ti*zm again, the readjusted test period is Ti*zm*z3, and Ti*zm*z3 is an integer.

After the mth preset adjustment coefficient zm is selected to adjust the adjusted initial test period Ti*zm again, m=1, 2,3, and then the adjusted initial test period Ti*zm*zm is taken as the first test period.

Specifically, adjusting the initial test period Ti according to the difference between two adjacent historical precision spot inspection result data and then correcting the adjusted initial test period Ti according to the historical maintenance frequency to obtain the first test period include:

After obtaining the historical maintenance data, determine the historical maintenance frequency Q0 of the equipment to be inspected according to the historical maintenance data;

Preset the first preset maintenance frequency Q1, the second preset maintenance frequency Q2, the third preset maintenance frequency Q3 and the fourth preset maintenance frequency Q4, and Q1<Q2<Q3<Q4; preset the first preset correction coefficient y1, the second preset correction coefficient y2, the third preset correction coefficient y3 and the fourth preset correction coefficient y4, and 1<y1<y2<y3<y4<1.5;

After obtaining the adjusted initial test period Ti*zm or Ti*zm*zm, select the correction coefficient according to the relationship between the historical maintenance frequency Q0 and each preset maintenance frequency, and correct the adjusted initial test period Ti*zm or Ti*zm*zm:

When Q1≤Q0≤Q2, select the first preset correction coefficient y1 to correct the adjusted initial test period Ti*zm or Ti*zm*zm, and the corrected test period is Ti*zm*y1 or Ti*zm*zm*y1;

When Q2≤Q0≤Q3, select the second preset correction coefficient y2 to correct the adjusted initial test period Ti*zm or Ti*zm*zm, and the corrected test period is Ti*zm*y2 or Ti*zm*zm*y2;

When $Q3 \leq Q0 \leq Q4$, select the third preset correction coefficient y3 to correct the adjusted initial test period Ti*zm or Ti*zm*zm, and the corrected test period is Ti*zm*y3 or Ti*zm*zm*zm*y3;

When $Q4 \leq Q0$, select the fourth preset correction coefficient y4 to correct the adjusted initial test period Ti*zm or Ti*zm*zm, and the corrected test period is Ti*zm*y4 or Ti*zm*zm*zm*y4;

After selecting the ith preset correction coefficient yi to correct the adjusted initial test period Ti*zm or Ti*zm*zm, i=1,2,3,4, and the corrected test period Ti*zm*yi or Ti*zm*zm*yi is taken as the first test period.

Step S300: Perform the precision spot inspection on the equipment to be inspected according to the first test period, obtain the precision spot inspection results within the first test period, continue performing the precision spot inspection on the equipment to be inspected according to the first test period when the precision spot inspection result is less than the standard value, adjust the first test period to obtain the second test period when the precision spot inspection result is more than or equal to the standard value, and perform the precision spot inspection on the equipment to be inspected according to the second test period.

Specifically, taking the corrected test period Ti*zm*yi or Ti*zm*zm*yi as the first test period includes:

Perform the precision spot inspection on the equipment to be inspected according to the first test period, and obtain the precision spot inspection results within the first test period, which includes the overall vibration value $\Delta C1$, the infrared temperature value $\Delta D1$ and the ultrasonic value $\Delta E1$ within the first test period; wherein, When the overall vibration value $\Delta C1$, the infrared temperature value $\Delta D1$ and the ultrasonic value $\Delta E1$ within the first test period are less than the standard values, do not adjust the first test period Ti*zm*yi or Ti*zm*zm*yi, and continue to perform the precision spot inspection on the equipment to be inspected according to the first test period;

When at least one of the overall vibration value $\Delta C1$, the infrared temperature value $\Delta D1$ and the ultrasonic value $\Delta E1$ within the first test period is more than or equal to the standard value, adjust the first test period Ti*zm*yi or Ti*zm*zm*yi to obtain the second test period, and perform the precision spot inspection on the equipment to be inspected according to the second test period.

Specifically, presetting the standard values which include the preset standard overall vibration value C10, the preset standard infrared temperature value D10 and the preset standard ultrasonic value E10 and obtaining the overall vibration value $\Delta C1$, the infrared temperature value $\Delta D1$ and the ultrasonic value $\Delta E1$ within the first test period include:

Preset the first compensation coefficient r1, the second compensation coefficient r2, the third compensation coefficient r3 and the fourth compensation coefficient r4, and $0.8 < r1 < r2 < r3 < r4 < 1$;

When $\Delta C1 < C10$, $\Delta D1 < D10$ and $\Delta E1 < E10$, the first test period Ti*zm*yi or Ti*zm*zm*yi is not adjusted;

When at least one of the overall vibration value $\Delta C1$, the infrared temperature value $\Delta D1$ and the ultrasonic value $\Delta E1$ within the first test period is more than or equal to the standard value, adjust the first test period Ti*zm*yi or Ti*zm*zm*yi, specifically:

When $\Delta C1 \geq C10$, $\Delta D1 < D10$ and $\Delta E1 < E10$, or $\Delta C1 < C10$, $\Delta D1 \geq D10$ and $\Delta E1 < E10$, or $\Delta C1 < C10$, $\Delta D1 < D10$ and $\Delta E1 \geq E10$, select the first compensation coefficient r1 to compensate the first test period Ti*zm*yi or Ti*zm*zm*yi, and the compensated test period is Ti*zm*yi*r1 or Ti*zm*zm*yi*r1, which is taken as the second test period;

When $\Delta C1 \geq C10$, $\Delta D1 \geq D10$ and $\Delta E1 < E10$, or $\Delta C1 \geq C10$, $\Delta D1 < D10$ and $\Delta E1 \geq E10$, or $\Delta C1 < C10$, $\Delta D1 \geq D10$ and $\Delta E1 \geq E10$, select the second compensation coefficient r2 to compensate the first test period Ti*zm*yi or Ti*zm*zm*yi, and the compensated test period is Ti*zm*yi*r2 or Ti*zm*zm*yi*r2, which is taken as the second test period;

When $\Delta C1 \geq C10$, $\Delta D1 \geq D10$ and $\Delta E1 \geq E10$, select the third compensation coefficient r3 to compensate the first test period Ti*zm*yi or Ti*zm*zm*yi, and the compensated test period is Ti*zm*yi*r3 or Ti*zm*zm*yi*r3, which is taken as the second test period.

Specifically, set the standard values of multiple monitoring values according to the historical data of the thermal power equipment, judge that the thermal power equipment may have hidden dangers in the operation when a large difference exists between the monitoring value and the standard value in the first test period, set the compensation factor to shorten the test period, increase the number of tests, and monitor faults in a timelier manner for maintenance.

It can be seen that in the embodiment, the test period of the thermal power equipment is adjusted during the precision spot inspection by obtaining multi-dimensional data information of the thermal power equipment, which can effectively improve the effectiveness and accuracy of the test period.

Figure 2:
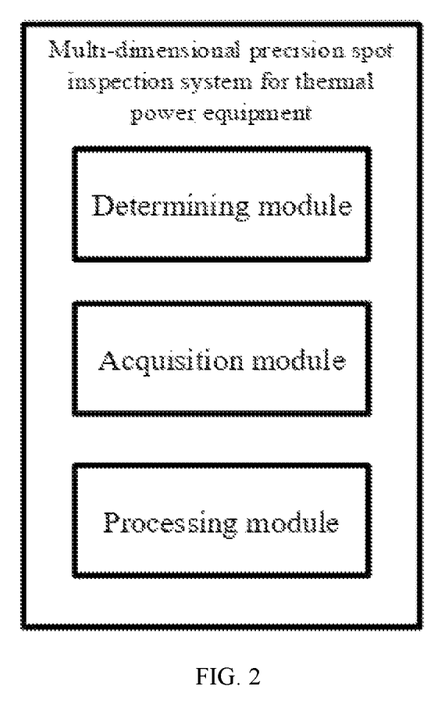
FIG. 2 is the functional block diagram of a multi-dimensional precision spot inspection method for thermal power equipment provided by the embodiment of the invention.

In another preferred embodiment based on the above embodiment, as shown in FIG. 2, this embodiment provides a multidimensional precision spot inspection system for thermal power equipment, comprising:

A determining module, which is used to determine the equipment requiring precision spot inspection, mark the equipment as the equipment to be inspected, determine the importance index of the equipment to be inspected, and determine the initial test period of the equipment to be inspected according to the importance index;

An acquisition module, which is used to acquire the historical precision spot inspection information of the equipment to be inspected, adjust the initial test period of the equipment to be inspected according to the historical precision spot inspection information, and obtain the first test period;

An processing module, which is used to perform the precision spot inspection on the equipment to be inspected according to the first test period, obtain the precision spot inspection results within the first test period, continue performing the precision spot inspection on the equipment to be inspected according to the first test period when the precision spot inspection result is less than the standard value, adjust the first test period to obtain the second test period when the precision spot inspection result is more than or equal to the standard value, and perform the precision spot inspection on the equipment to be inspected according to the second test period.

Specifically, the determining module is also used to determine the initial test period of the equipment to be inspected according to the importance index, including:

Determine the importance index A0 of the equipment to be inspected, preset the first preset importance index A1, the second preset importance index A2, the third preset importance index A3 and the fourth preset importance index A4, and $A1 > A2 > A3 > A4$;

Preset the first preset test period T1, the second preset test period T2, the third preset test period T3 and the fourth preset test period T4, and $0 < T1 < T2 < T3 < T4$;

Determine the initial test period of the equipment to be inspected according to the relationship between the importance index A0 and each preset importance index:

When A0≥A1, select the first preset test period T1 as the initial test period of the equipment to be inspected;

When A1>A0≥A22, select the second preset test period T2 as the initial test period of the equipment to be inspected;

When A2>A0≥A3, select the third preset test period T3 as the initial test period of the equipment to be inspected;

When A3>A0≥A4, select the fourth preset test period T4 as the initial test period of the equipment to be inspected;

After the ith preset test period Ti is selected as the initial test period of the equipment to be inspected, i=1,2,3,4, and then the initial test period of the equipment to be inspected is Ti at this time, which is denoted as the initial test period Ti.

It is understandable that in the above embodiment, the test period of the thermal power equipment is adjusted during the precision spot inspection by obtaining multi-dimensional data information of the thermal power equipment, which can effectively improve the effectiveness and accuracy of the test period.

The technicians in the field should understand that the embodiments of the application may be provided as methods, systems, or computer program products. Therefore, the application may take the form of a full hardware embodiment, full software embodiment, or combination of software and hardware embodiments. Further, the application may take the form of a computer program product implemented on one or more computer available storage media (including but not limited to disk memory, CD-ROM, optical memory, etc.) in which computer available program codes are contained.

The application is described by reference to the flowcharts and/or block diagrams of the methods, equipment (systems), and computer program products based on the embodiments of the application. It should be understood that each flow and/or block in the flowchart and/or block diagram, and a combination of flows and/or blocks in the flowchart and/or block diagram can be implemented by computer program instructions. The computer program instructions may be sent to a processor of a special-purpose computer, an embedded processor or other programmable data processing equipment to generate a machine, so that the instructions executed by the processor of the computer or other programmable data processing equipment generates a device used to implement functions specified in one or more flows of the flowchart and/or one or more blocks of the block diagram.

The computer program instructions may also be stored in a computer-readable memory capable of directing the computer or other programmable data processing equipment to work in a specific way, so that the instructions stored in the computer-readable memory generate manufactures including a command device, which implements functions specified in one or more flows of the flowchart and/or one or more blocks of the block diagram.

The computer program instructions may also be loaded onto the computer or other programmable data processing equipment, so that a series of operational steps are performed on the computer or other programmable data processing equipment to generate computer-implemented processing, and thus the instructions executed on the computer or other programmable equipment provide steps to implement functions specified in one or more flows of the flowchart and/or one or more blocks of the block diagram.

Finally, it should be noted that the above embodiments are used only to describe the technical proposal of the invention and not to restrict it. Although the invention is described in detail by reference to the above embodiments, the ordinary technicians in the field should understand that the embodiments of the invention may still be modified or equivalently replaced, and any modification or equivalent replacement not deviating from spirit and scope of the invention should be covered by the claims of the invention.

The invention claimed is:

1. A multi-dimensional spot inspection system for thermal power equipment, comprising:
   multiple testing instruments that are used for offline testing of thermal power equipment; one or more processors; memory storing instructions, executable by the one or more processors, that, when executed by the one or more processors, cause the one or more processors to:
   read an equipment to be inspected, and an importance index of the equipment to be inspected, which are stored in the memory, and determine an initial test period of the equipment to be inspected according to the importance index;
   acquire historical spot inspection information of the equipment to be inspected, which is stored in the memory, adjust the initial test period of the equipment to be inspected according to the historical spot inspection information, so as to obtain a first test period which will be stored in the memory;
   send first testing instructions to the multiple testing instruments to perform the spot inspection on the equipment to be inspected according to the first test period, obtain the spot inspection results within the first test period, continue to send the first testing instructions to the multiple testing instruments to perform the spot inspection on the equipment to be inspected according to the first test period when the spot inspection result is less than the standard value, adjust the first test period to obtain a second test period when the spot inspection result is more than or equal to the standard value, and to send second testing instructions to the multiple testing instruments to perform the spot inspection on the equipment to be inspected according to the second test period; and
   send maintenance instructions for the thermal power equipment to maintenance personnel based on the spot inspection results performed in the first test period or the spot inspection results performed in the second test period;
   wherein when the one or more processors are used to determine the initial test period of the equipment to be inspected according to the importance index, the the one or more processors are specifically used to:
   determine the importance index A0 of the equipment to be inspected, preset the first preset importance index A1, the second preset importance index A2, the third preset importance index A3 and the fourth preset importance index A4, and A1>A2>A3>A4;
   preset the first preset test period T1, the second preset test period T2, the third preset test period T3 and the fourth preset test period T4, and 0<T1<T2<T3<T4;
   determine the initial test period of the equipment to be inspected according to the relationship between the importance index A0 and each preset importance index;
   when A0≥A1, select the first preset test period T1 as the initial test period of the equipment to be inspected;
   when A1>A0≥A22, select the second preset test period T2 as the initial test period of the equipment to be inspected;

when A2>A0≥A3, select the third preset test period T3 as the initial test period of the equipment to be inspected;

when A3>A≥A4, select the fourth preset test period T4 as the initial test period of the equipment to be inspected;

after the $i^{th}$ preset test period Ti is selected as the initial test period of the equipment to be inspected, i=1,2,3,4, and then the initial test period of the equipment to be inspected is Ti at this time, which is denoted as the initial test period Ti;

wherein when the one or more processors are used to acquire the historical spot inspection information of the equipment to be inspected, which is stored in the memory, adjust the initial test period of the equipment to be inspected according to the historical spot inspection information, so as to obtain the first test period, the one or more processors are specifically used to:

after determining the initial test period Ti, acquire the historical spot inspection information of the equipment to be inspected, which includes the historical spot inspection result data and the historical maintenance data of the equipment to be inspected, and adjust the initial test test period Ti according to the historical spot inspection result data and the historical maintenance data; wherein, after obtaining the historical inspection check information, determine whether the historical spot inspection result data and the historical maintenance data are obtained:

if only the historical spot inspection result data is obtained, determine the difference between two adjacent historical spot inspection result data, adjust the initial test period Ti according to the difference between two adjacent historical spot inspection result data to obtain the first test period;

if both the historical spot inspection result data and the historical maintenance data are obtained, determine the difference between two adjacent historical spot inspection result data, obtain the historical maintenance frequency of the equipment to be inspected, adjust the initial test period Ti according to the difference between two adjacent historical spot inspection result data, and then correct the adjusted initial test period Ti according to the historical maintenance frequency to obtain the first test period;

wherein when the one or more processors are used to adjust the initial test period Ti based on the difference between two adjacent historical spot inspection result data, the one or more processors are specifically used to:

after obtaining the historical spot inspection result data, establish the historical result matrix B according to the historical spot inspection result data, set B (C1, D1, E1, C2, D2, E2, C3, D3, E3, . . . , Cn, Dn, En), where $C_1$ to $C_n$ are overall vibration values of the equipment to be inspected which are respectively obtained from the $1^{st}$ spot inspection to the $n^{th}$ spot inspection, $D_1$ to $D_n$ are infrared temperature values of the equipment to be inspected which are respectively obtained from the $1^{st}$ spot inspection to the $n^{th}$ spot inspection, $E_1$ to $E_n$ are ultrasonic values of the equipment to be inspected which are respectively obtained from the $1^{st}$ spot inspection to the $n^{th}$ spot inspection;

preset the preset overall vibration difference c0, the preset standard infrared temperature difference do and the preset standard ultrasonic difference e0; preset the first preset adjustment coefficient z1, the second preset adjustment coefficient z2 and the third preset adjustment coefficient z3, and 1>z1>z2>z3>0.8;

obtain the overall vibration values, the infrared temperature values and the ultrasonic values within the last two periods in the historical result matrix B, obtain two adjacent overall vibration differences, denoted as $C_{n-1}$-$C_n$, obtain two adjacent infrared temperature differences, denoted as $D_{n-1}$-$D_n$, and obtain two adjacent ultrasonic differences, denoted as $E_{n-1}$-$E_n$;

compare $C_{n-1}$-$C_n$, $D_{n-1}$-$D_n$ and $E_{n-1}$-$E_n$ with c0, d0 and e0 respectively, and select the adjustment coefficient according to the comparison results to adjust the initial test period Ti:

when $C_{n-1}$-$C_n$≤c0, $D_{n-1}$-$D_n$≤d0 and $E_{n-1}$-$E_n$≤e0, the initial test period Ti is not adjusted;

when $C_{n-1}$-$C_n$>c0, $D_{n-1}$-$D_n$≤d0 and $E_{n-1}$-$E_n$≤e0, or $C_{n-1}$-$C_n$≤c0, $D_{n-1}$-$D_n$>d0 and $E_{n-1}$-$E_n$≤e0, or $C_{n-1}$-$C_n$≤c0, $D_{n-1}$-$D_n$≤d0 and $E_{n-1}$-$E_n$>e0, select the first preset adjustment coefficient z1 to adjust the initial test period Ti, the adjusted initial test period is Ti*z1, and Ti*z1 is an integer;

when $C_{n-1}$-$C_n$>c0, $D_{n-1}$-$D_n$>d0 and $E_{n-1}$-$E_n$≤e0, or $C_{n-1}$-$C_n$≤c0, $D_{n-1}$-$D_n$>d0 and $E_{n-1}$-$E_n$>e0, or $C_{n-1}$-$C_n$>c0, $D_{n-1}$-$D_n$≤d0 and $E_{n-1}$-$E_n$>e0, select the second preset adjustment coefficient z2 to adjust the initial test period Ti, the adjusted initial test period is Ti*z2, and Ti*z2 is an integer;

when $C_{n-1}$-$C_n$>c0, $D_{n-1}$-$D_n$>d0 and $E_{n-1}$-$E_n$>e0, select the third preset adjustment coefficient z3 to adjust the initial test period Ti, the adjusted initial test period is Ti*z3, and Ti*z3 is an integer;

after the $m^{th}$ preset adjustment coefficient zm is selected to adjust the initial test period Ti, m=1,2,3, and then the adjusted initial test period Ti*zm is taken as the first test period.

2. The multi-dimensional spot inspection system for thermal power equipment of claim 1, wherein when the adjusted initial test period Ti*zm is taken as the first test period, the one or more processors are specifically used to:

after establishing the historical result matrix B based on the historical spot inspection result data, determine the overall vibration average c01, the infrared temperature average d01 and the ultrasonic average e01 according to the historical result matrix B, where c01=($C_1$+$C_2$+$C_3$+ . . . +$C_n$)/n, d01=($D_1$+$D_2$+$D_3$+ . . . +$D_n$)/n, and e01=($D_1$+$D_2$+$D_3$+ . . . +$D_n$)/n;

preset the preset standard overall vibration average ca, the preset standard infrared temperature average da and the preset standard ultrasonic average ea, and adjust the adjusted initial test period Ti*zm again according to the relationship between the overall vibration average c01, the infrared temperature average d01 and the ultrasonic average e01, and the preset standard overall vibration average ca, the preset standard infrared temperature average da and the preset standard ultrasonic average ea respectively:

when c01≤ca, d01≤da and e01≤ea, the adjusted initial test period Ti*zm is not adjusted again;

when c01>ca, d01≤da and e01≤ea, or c01≤ca, d01>da and e01≤ea, or c01≤ca, d01≤da and e01>ea, select the first preset adjustment coefficient z1 to adjust the adjusted initial test period Ti*zm again, the readjusted test period is Ti*zm*z1, and Ti*zm*z1 is an integer;

when c01>ca, d01>da and e01≤ea, or c01>ca, d01>da and e01≤ea, or c01>ca, d01≤da and e01>ea, select the second preset adjustment coefficient z2 to adjust the adjusted initial test period Ti*zm again, the readjusted test period is Ti*zm*z2, and Ti*zm*z2 is an integer;

when c01>ca, d01>da and e01>ea, select the third preset adjustment coefficient z3 to adjust the adjusted initial test period Ti*zm again, the readjusted test period is Ti*zm*z3, and Ti*zm*z3 is an integer;

after the $m^{th}$ preset adjustment coefficient zm is selected to adjust the adjusted initial test period Ti*zm again, m=1,2,3, and then the adjusted initial test period Ti*zm*zm is taken as the first test period.

3. The multi-dimensional spot inspection system for thermal power equipment of claim 2, wherein when adjusting the initial test period Ti according to the difference between two adjacent historical spot inspection result data and then correcting the adjusted initial test period Ti according to the historical maintenance frequency to obtain the first test period, the one or more processors are specifically used to:

after obtaining the historical maintenance data, determine the historical maintenance frequency Q0 of the equipment to be inspected according to the historical maintenance data;

preset the first preset maintenance frequency Q1, the second preset maintenance frequency Q2, the third preset maintenance frequency Q3 and the fourth preset maintenance frequency Q4, and Q1<Q2<Q3<Q4; preset the first preset correction coefficient y1, the second preset correction coefficient y2, the third preset correction coefficient y3 and the fourth preset correction coefficient y4, and 1<y1<y2<y3<y4<1.5;

after obtaining the adjusted initial test period Ti*zm or Ti*zm*zm, select the correction coefficient according to the relationship between the historical maintenance frequency Q0 and each preset maintenance frequency, and correct the adjusted initial test period Ti*zm or Ti*zm*zm:

when Q1≤Q0<Q2, select the first preset correction coefficient y1 to correct the adjusted initial test period Ti*zm or Ti*zm*zm, and the corrected test period is Ti*zm*y1 or Ti*zm*zm*zm*y1;

when Q2≤Q0<Q3, select the second preset correction coefficient y2 to correct the adjusted initial test period Ti*zm or Ti*zm*zm, and the corrected test period is Ti*zm*y2 or Ti*zm*zm*zm*y2;

when Q3≤Q0<Q4, select the third preset correction coefficient y3 to correct the adjusted initial test period Ti*zm or Ti*zm*zm, and the corrected test period is Ti*zm*y3 or Ti*zm*zm*zm*y3;

when Q4≤Q0, select the fourth preset correction coefficient y4 to correct the adjusted initial test period Ti*zm or Ti*zm*zm, and the corrected test period is Ti*zm*y4 or Ti*zm*zm*zm*y4;

after selecting the $i^{th}$ preset correction coefficient yi to correct the adjusted initial test period Ti*zm or Ti*zm*zm, i=1,2,3,4, and the corrected test period Ti*zm*yi or Ti*zm*zm*yi is taken as the first test period.

4. The multi-dimensional spot inspection system for thermal power equipment of claim 3, wherein when the corrected test period Ti*zm*yi or Ti*zm*zm*yi is taken as the first test period, the one or more processors are specifically used to:

perform the spot inspection on the equipment to be inspected according to the first test period, and obtain the spot inspection results within the first test period, which includes the overall vibration value ΔC1, the infrared temperature value ΔD1 and the ultrasonic value ΔE1 within the first test period; wherein, when the overall vibration value ΔC1, the infrared temperature value ΔD1 and the ultrasonic value ΔE1 within the first test period are less than the standard values, do not adjust the first test period Ti*zm*yi or Ti*zm*zm*yi, and continue to perform the spot inspection on the equipment to be inspected according to the first test period;

when at least one of the overall vibration value ΔC1, the infrared temperature value ΔD1 and the ultrasonic value ΔE1 within the first test period is more than or equal to the standard value, adjust the first test period Ti*zm*yi or Ti*zm*zm*yi to obtain the second test period, and perform the spot inspection on the equipment to be inspected according to the second test period.

5. The multi-dimensional spot inspection system for thermal power equipment of claim 4, wherein when presetting the standard values which include the preset standard overall vibration value C10, the preset standard infrared temperature value D10 and the preset standard ultrasonic value E10, and obtaining the overall vibration value ΔC1, the infrared temperature value ΔD1 and the ultrasonic value ΔE1 within the first test period, the one or more processors are specifically used to:

preset the first compensation coefficient r1, the second compensation coefficient r2, the third compensation coefficient r3 and the fourth compensation coefficient r4, and 0.8<r1<r2<3<r4<1;

when ΔC1<C10, ΔD1<D10 and ΔE1<E10, the first test period Ti*zm*yi or Ti*zm*zm*yi is not adjusted;

when at least one of the overall vibration value ΔC1, the infrared temperature value ΔD1 and the ultrasonic value ΔE1 within the first test period is more than or equal to the standard value, adjust the first test period Ti*zm*yi or Ti*zm*zm*yi, specifically:

when ΔC1≥C10, ΔD1<D10 And ΔE1<E10, or ΔC1<C10, ΔD1≥D10 and ΔE1<E10, or ΔC1<C10, ΔD1<D10 and ΔE12≥E10, select the first compensation coefficient r1 to compensate the first test period Ti*zm*yi or Ti*zm*zm*yi, and the compensated test period is Ti*zm*yi*r1 or Ti*zm*zm*yi*r1, which is taken as the second test period;

when ΔC1≥C10, ΔD1≥D10 and ΔE1<E10, or ΔC1≥C10, ΔD1<D10 and ΔE1≥E10, or ΔC1<C10, ΔD1≥D10 and ΔE1≥E10, select the second compensation coefficient r2 to compensate the first test period Ti*zm*yi or Ti*zm*zm*yi, and the compensated test period is Ti*zm*yi*r2 or Ti*zm*zm*yi*r2, which is taken as the second test period;

when ΔC1≥C10, ΔD1≥D10 and ΔE1≥E10, select the third compensation coefficient r3 to compensate the first test period Ti*zm*yi or Ti*zm*zm*yi, and the compensated test period is Ti*zm*yi*r3 or Ti*zm*zm*yi*r3, which is taken as the second test period.

* * * * *